(12) United States Patent
Owechko et al.

(10) Patent No.: US 12,092,733 B2
(45) Date of Patent: Sep. 17, 2024

(54) RADAR ANTI-SPOOFING SYSTEM FOR IDENTIFYING GHOST OBJECTS CREATED BY RECIPROCITY-BASED SENSOR SPOOFING

(71) Applicant: GM Global Technology Operations LLC, Detroit, MI (US)

(72) Inventors: Yuri Owechko, Newbury Park, CA (US); Qin Jiang, Woodland Hills, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 17/551,644

(22) Filed: Dec. 15, 2021

(65) Prior Publication Data

US 2023/0184926 A1 Jun. 15, 2023

(51) Int. Cl.
*G01S 13/90* (2006.01)
*G01S 13/50* (2006.01)
(Continued)

(52) U.S. Cl.
CPC ........ *G01S 13/9027* (2019.05); *G01S 13/505* (2013.01); *G01S 13/9011* (2013.01);
(Continued)

(58) Field of Classification Search
CPC ............... G01S 13/9027; G01S 13/505; G01S 13/9011; G06V 10/762; G06V 10/761; G06V 10/809; G06V 10/62
See application file for complete search history.

(56) References Cited

U.S. PATENT DOCUMENTS 10,572,737 B2 * 2/2020 Leizerovich ........... H04N 23/80
2011/0068970 A1 * 3/2011 Mitsumoto ........... G01S 13/931
342/113
(Continued)

FOREIGN PATENT DOCUMENTS

CN 1913415 A * 2/2007
CN 110197211 A * 9/2019
(Continued)

OTHER PUBLICATIONS

Kim S, KR 101235506 B1 (Year: 2013).*
(Continued)

*Primary Examiner* — Vladimir Magloire
*Assistant Examiner* — Maxine McKenzie Phillips
(74) *Attorney, Agent, or Firm* — Vivacqua Crane, PLLC

(57) ABSTRACT

A radar anti-spoofing system for an autonomous vehicle includes a plurality of radar sensors that generate a plurality of input detection points representing radio frequency (RF) signals reflected from objects and a controller in electronic communication with the plurality of radar sensors. The controller executes instructions to determine time-matched clusters that represent objects located in an environment surrounding the autonomous vehicle based on the input detection points from the plurality of radar sensors. The controller determines an adjusted signal to noise (SNR) measure for a specific time-matched cluster by dividing an SNR of the specific time-matched cluster by a range measurement of the specific time-matched cluster. The controller determines a velocity-ratio measure of the time-matched cluster by dividing a motion-based velocity by a Doppler-frequency velocity, and identifies the time-matched cluster as either a ghost object or a real object.

20 Claims, 3 Drawing Sheets

(51) Int. Cl.
*G06V 10/62* (2022.01)
*G06V 10/74* (2022.01)
*G06V 10/762* (2022.01)
*G06V 10/80* (2022.01)

(52) U.S. Cl.
CPC ............ *G06V 10/62* (2022.01); *G06V 10/761* (2022.01); *G06V 10/762* (2022.01); *G06V 10/809* (2022.01)

(56) References Cited

U.S. PATENT DOCUMENTS

| | | | |
|---|---|---|---|
| 2015/0301167 A1* | 10/2015 | Sentelle | A61B 5/0205 342/22 |
| 2015/0323649 A1* | 11/2015 | Lee | G01S 13/584 342/27 |
| 2019/0391250 A1* | 12/2019 | Cohen | G01S 13/87 |
| 2021/0109227 A1* | 4/2021 | Jones | G01S 19/215 |
| 2021/0256321 A1* | 8/2021 | Gerardo Castro | G06F 18/2411 |
| 2021/0318414 A1* | 10/2021 | Lesi | G01S 13/582 |
| 2021/0325508 A1 | 10/2021 | Wang et al. | |
| 2022/0107184 A1 | 4/2022 | Omr et al. | |

FOREIGN PATENT DOCUMENTS

| | | | |
|---|---|---|---|
| JP | 2013242237 A * | 12/2013 | |
| TW | 729687 B1 * | 6/2021 | G01S 13/04 |
| WO | 2022104096 A1 | 5/2022 | |

OTHER PUBLICATIONS

United States Patent and Trademark Office. Notice of Allowance for U.S. Appl. No. 17/551,666, mailed Dec. 1, 2023, pp. 6-20.

Djuric, P. M., et al. "Particle Filtering", IEEE Signal Processing Magazine, Sep. 2003, pp. 19-38, vol. 20, No. 5.

Arulampalam, M. S., et al. "A tutorial on particle filters for online nonlinear/non-Gaussian Bayesian tracking", IEEE Transactions on Signal Processing, Feb. 2002, pp. 174-188, vol. 50, No. 2.

Kerns A. J., et al. "Unmanned aircraft capture and control via GPS spoofing," Journal of Field Robotics, Apr. 2014, pp. 617-636, vol. 31, issue 4.

Kwon, C., et al. "Security analysis for cyber-physical systems against stealthy deception attacks", in American Control Conference (ACC), Jun. 2013, pp. 3344-3349.

Javaid, A. Y., et al. "Cyber security threat analysis and modeling of an unmanned aerial vehicle system", in Homeland Security (HST), Nov. 2012, pp. 585-590.

Davidson, D., et al. "Controlling UAVs with Sensor Input Spoofing Attacks", WOOT' 16: Proceedings of the 10th USENIX Conference on Offensive Technologies, Aug. 2016, pp. 221-231.

Zhang Z., et al. "Strategies to Design Signals to Spoof Kalman Filter", 2018 Annual American Control Conference (ACC), Jun. 2018, pp. 5837-5842.

Bezzo, N., et al. "Attack resilient state estimation for autonomous robotic systems," IEEE/RSJ International Conference on Intelligent Robots and Systems, Sep. 2014, pp. 3692-3698.

* cited by examiner

RADAR ANTI-SPOOFING SYSTEM FOR IDENTIFYING GHOST OBJECTS CREATED BY RECIPROCITY-BASED SENSOR SPOOFING

INTRODUCTION

The present disclosure relates to a radar anti-spoofing system and method for identifying ghost objects created by reciprocity-based sensor spoofing based on values of an adjusted signal to noise ratio (SNR) measure and a velocity-ratio measure for objects in the environment.

Autonomous vehicles may use a variety of sensors for environment sensing such as, for example, radar sensors, vision sensors, and LiDAR sensors. Any type of autonomous sensor may be spoofed, however, radar sensors tend to be spoofed most easily when compared to other autonomous sensors. Although radar sensors are easily spoofed, they are also the only autonomous sensor that works in many types of weather, and therefore it is advantageous to develop anti-spoofing techniques for radar sensors.

There are two possible approaches for spoofing a radar sensor. The first approach is referred to as one-way spoofing, where the spoofer receives radio frequency (RF) signals transmitted by a particular autonomous vehicle. The spoofer delays the RF signals, and then transmits the RF signals back to the particular autonomous vehicle. The RF signals are interpreted as ghost targets by the autonomous vehicle's radar system. The spoofer may control the position of the ghost target based on the time delay before sending the RF signal back to the particular autonomous vehicle.

The second approach for spoofing a radar sensor may be referred to as reciprocity-based spoofing, where the radar of the autonomous vehicle receives RF signals reflected from real or actual targets, however, the RF signals were originally emitted by a spoofer. In this approach, the time delay of the RF signals are not matched with the distances between the autonomous vehicle and the target, and therefore ghost targets are presented in the autonomous vehicle's radar system at distances different from the target distance. In reciprocity-based spoofing, the ghost targets are presented in both the spoofer and the autonomous vehicle radar systems. Specifically, the spoofer's radar also receives ghost signals that were reflected from real objects and emitted from the autonomous vehicle's radar. Accordingly, in one-way spoofing, the spoofing signals are received directly from the emitter of the spoofer. In contrast, when using reciprocity-based spoofing, the spoofing signals are reflected from real targets. Thus, different anti-spoofing techniques are required to detect ghost targets for each different type of spoofing.

Thus, while current anti-spoofing techniques achieve their intended purpose, there is a need in the art for approaches that identify ghost objects created by reciprocity-based spoofing.

SUMMARY

According to several aspects, a radar anti-spoofing system for an autonomous vehicle is disclosed. The radar anti-spoofing system includes a plurality of radar sensors that generate a plurality of input detection points representing radio frequency (RF) signals reflected from objects, and one or more controllers in electronic communication with the plurality of radar sensors. The one or more controllers execute instructions to determine time-matched clusters that represent objects located in an environment surrounding the autonomous vehicle based on the plurality of input detection points from the plurality of radar sensors. The one or more controllers execute instructions to determine an adjusted signal to noise (SNR) measure for a specific time-matched cluster by dividing an SNR of the specific time-matched cluster by a range measurement of the specific time-matched cluster. The one or more controllers execute instructions to determine a motion-based velocity of the time-matched cluster based on a motion vector of the time-matched cluster. The one or more controllers execute instructions to determine a Doppler-frequency velocity of the time-matched cluster. The one or more controllers execute instructions to determine a velocity-ratio measure of the time-matched cluster by dividing the motion-based velocity by the Doppler-frequency velocity, and identify the time-matched cluster as either a ghost object or a real object by a thresholding technique based on the values of the adjusted SNR measure and the velocity-ratio measure.

In an aspect, the controller executes instructions to execute a clustering algorithm to divide the plurality of input detection points from the plurality of radar sensors into a plurality of clusters.

In another aspect, the clustering algorithm is a fuzzy c-mean clustering algorithm.

In yet another aspect, the controller executes instructions to merge close clusters of the plurality of clusters together with one another to create a plurality of merged clusters, where a close cluster is determined based on a minimum distance between the plurality of clusters.

In an aspect, the minimum distance is based on a resolution of the plurality of radar sensors and an application domain.

In another aspect, the controller executes instructions to match cluster centers in one detection frame with cluster centers in a next detection frame for the plurality of merged clusters based on a nearest neighbor technique to determine the time-matched clusters.

In yet another aspect, the motion-based velocity is determined by:

$$V_{mt}(i) = \frac{\sqrt{m_x^2(i) + m_y^{(2)}(i) + m_z^2(i)}}{dt}$$

where $V_{mt}(i)$ represents the motion-based velocity, $mv(i) = (m_x(i), m_y(i), m_z(i))$ is the motion vector of a cluster $c_t(i)$, and $dt$ is a time difference between two adjacent detection frames.

In an aspect, the Doppler-frequency velocity is determined by:

$$V_{dp}(i) = \frac{C}{2f_0} f_d(i)$$

where $V_{dp}(i)$ is the Doppler-frequency velocity, C is a speed of light, $f_0$ is a carrier frequency; and $f_d(i)$ is the Doppler-frequency of cluster $c_t(i)$.

In another aspect, the thresholding technique includes selecting a threshold range of values for the adjusted SNR measure that capture a mismatch between an SNR and the range measurement that is created by the ghost object.

In yet another aspect, the thresholding technique includes selecting a threshold range of values for the velocity-ratio measure to capture a mismatch between the motion-based velocity and the Doppler-frequency velocity created by the ghost object.

In an aspect, the ghost objects are produced by reciprocity-based spoofing.

In an aspect, a method for identifying ghost objects produced by reciprocity-based spoofing by a radar anti-spoofing system for an autonomous vehicle is disclosed. The method includes determining, by a controller, time-matched clusters that represent objects located in an environment surrounding the autonomous vehicle based on a plurality of input detection points generated by a plurality of radar sensors. The method includes determining, by the controller, an adjusted SNR measure for a specific time-matched cluster by dividing an SNR of the specific time-matched cluster by a range measurement of the specific time-matched cluster. The method further includes determining a motion-based velocity of the time-matched cluster based on a motion vector of the time-matched cluster. The method also includes determining a Doppler-frequency velocity of the time-matched cluster. The method includes determining a velocity-ratio measure of the time-matched cluster by dividing the motion-based velocity by the Doppler-frequency velocity. Finally, the method includes identifying the time-matched cluster as either a ghost object or a real object by a thresholding technique based on the values of the adjusted SNR measure and the velocity-ratio measure.

In another aspect, the method further comprises executing a clustering algorithm to divide the plurality of input detection points from the plurality of radar sensors into a plurality of clusters.

In yet another aspect, the clustering algorithm is a fuzzy c-mean clustering algorithm.

In an aspect, the method further comprises merging close clusters of the plurality of clusters together with one another to create a plurality of merged clusters, where a close cluster is determined based on a minimum distance between the plurality of clusters.

In another aspect, the method further comprises matching cluster centers in one detection frame with cluster centers in a next detection frame for the plurality of merged clusters based on a nearest neighbor technique to determine the time-matched clusters.

In yet another aspect, the method further comprises determining the motion-based velocity by:

$$V_{mt}(i) = \frac{\sqrt{m_x^2(i) + m_y^2(i) + m_z^2(i)}}{dt}$$

where $V_{mt}(i)$ represents the motion-based velocity, $mv(i) = (m_x(i), m_y(i), m_z(i))$ is the motion vector of a cluster $c_t(i)$, and dt is a time difference between two adjacent detection frames.

In an aspect, the method further comprises determining the Doppler-frequency velocity by:

$$V_{dp}(i) = \frac{C}{2f_0} f_d(i)$$

where $V_{dp}(i)$ is the Doppler-frequency velocity, C is a speed of light, $f_0$ is a carrier frequency; and $f_d(i)$ is the Doppler frequency of cluster $c_t(i)$.

In another aspect, the thresholding technique includes selecting a threshold range of values for the adjusted SNR measure that capture a mismatch between an SNR and the range measurement that is created by the ghost object.

In yet another aspect, the thresholding technique includes selecting a threshold range of values for the velocity-ratio measure to capture a mismatch between the motion-based velocity and the Doppler-frequency velocity created by the ghost object.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
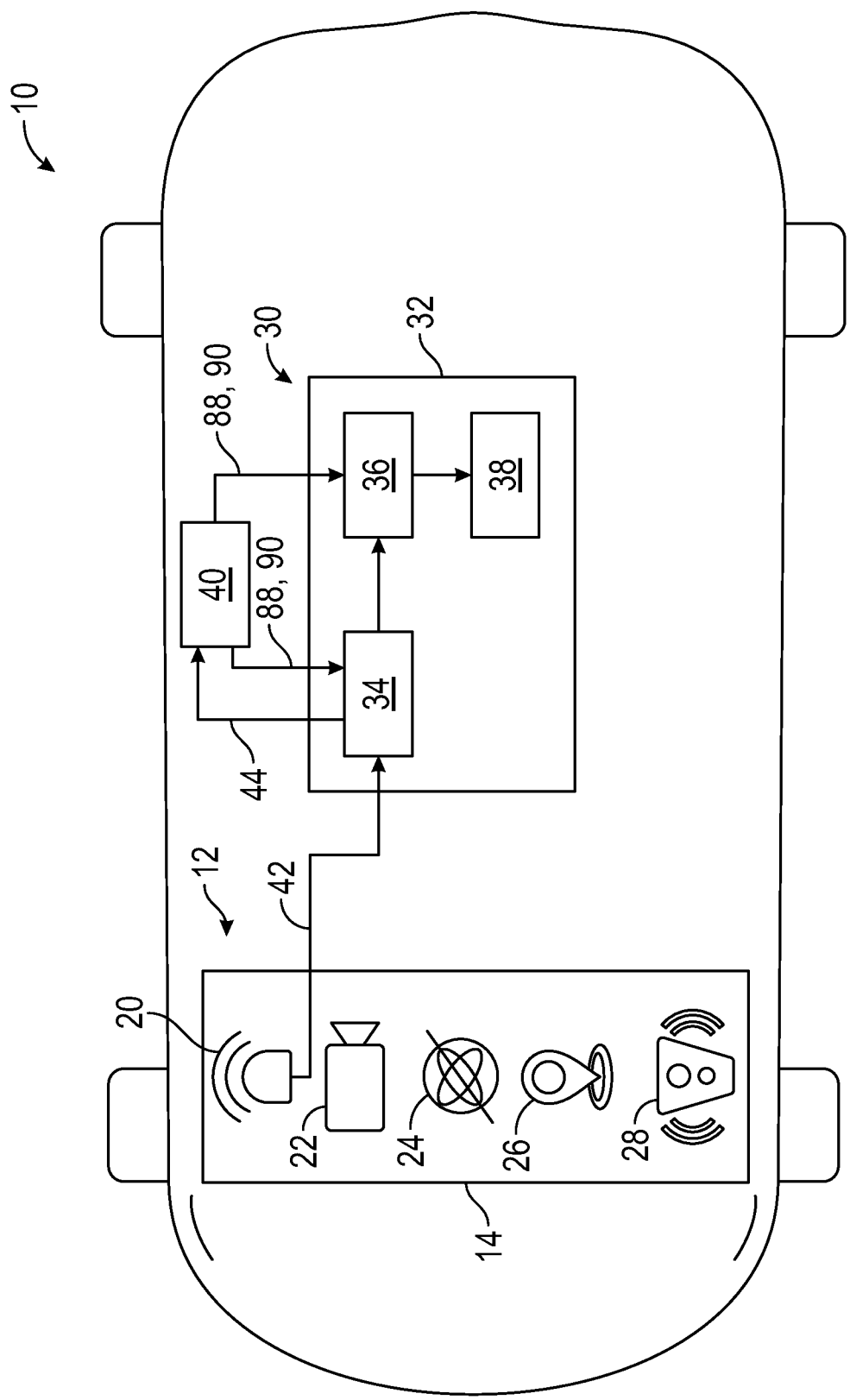
FIG. 1 is a schematic diagram of an exemplary autonomous vehicle including a radar system and the disclosed radar anti-spoofing system, according to an exemplary embodiment.

Referring to FIG. 1, an exemplary autonomous vehicle 10 is illustrated. The autonomous vehicle 10 has an autonomous driving system 12 that includes a plurality of on-board autonomous sensors 14. In the example as shown in FIG. 1, the plurality of on-board autonomous sensors 14 include a plurality of radar sensors 20, one or more cameras 22, an inertial measurement unit (IMU) 24, a global positioning system (GPS) 26, and LiDAR 28, however, it is to be appreciated that additional sensors may be used as well. The plurality of radar sensors 20 are part of a radar system 30. The radar system 30 includes one or more controllers 32. The one or more controllers 32 include an objection detection block 34, an object tracking block 36, an instruction block 38, and a radar anti-spoofing system 40. The plurality of radar sensors 20 generate a plurality of demodulated intermediate frequency signals that represent a plurality of input radio frequency (RF) signals 42 reflected from objects located in the environment surrounding the autonomous vehicle 10. The plurality of input RF signals 42 are received as input by the radar anti-spoofing system 40. The objection detection block 34 determines a plurality of input detection points 44 based on the plurality of RF signals 42.

As seen in FIG. 1, the radar anti-spoofing system 40 may be implemented as a stand-alone module, where no modifications are required by the objection detection block 34, the object tracking block 36, or the instruction block 38. As explained below, the radar anti-spoofing system 40 identifies ghost objects produced by a sensor spoofing technique referred to as reciprocity-based spoofing. In reciprocity-based spoofing, the plurality of radar sensors 20 receive RF signals reflected from real or actual targets, however, the RF signals were originally emitted by a spoofer.

Figure 2:
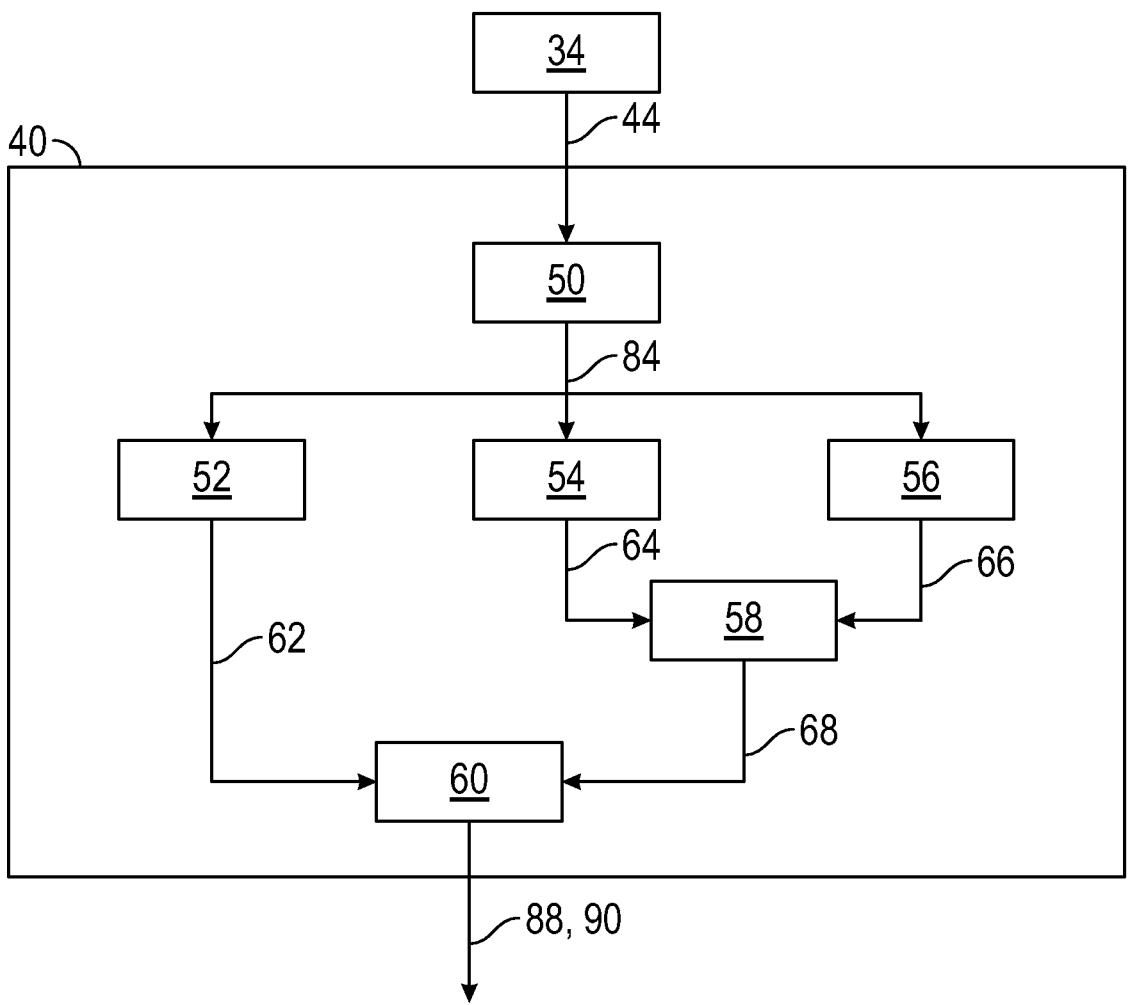
FIG. 2 is a block diagram of the radar anti-spoofing system shown in FIG. 1, according to an exemplary embodiment.

FIG. 2 is a block diagram of the radar anti-spoofing system 40. The radar anti-spoofing system 40 includes a tracking block 50, an adjusted signal-to-noise ratio (SNR) block 52, a first velocity computation block 54, a second velocity computation block 56, a velocity-ratio block 58, and an identification block 60. As explained below, the tracking block 50 determines time-matched clusters 84 that represent objects in the environment based on the plurality of input detection points 44 from the plurality of radar sensors 20. The adjusted SNR block 52 determines an adjusted SNR measure 62 for a time-matched cluster 84 representing an object. The adjusted SNR measure 62 is the SNR of the time-matched cluster 84 representing an object divided by a range measurement of the time-matched cluster 84 representing an object. The first and second velocity computation blocks 54, 56 determine respective velocities 64, 66 of the time-matched cluster 84, and the velocity-ratio block 58 determines a velocity-ratio measure 68 based on the respective velocities 64, 66. Specifically, the first velocity computation block 54 determines a motion-based velocity 64 of the object and the second velocity computation block 56 determines a Doppler-frequency velocity 66, and the velocity-ratio block 58 determines the velocity-ratio measure 68 by dividing the motion-based velocity 64 by the Doppler-frequency velocity 66. The identification block 60 then identifies each time-matched cluster 84 as either a ghost object 88 or a real object 90 by a thresholding technique based on the values of the adjusted SNR measure 62 and the velocity-ratio measure 68.

Figure 3:
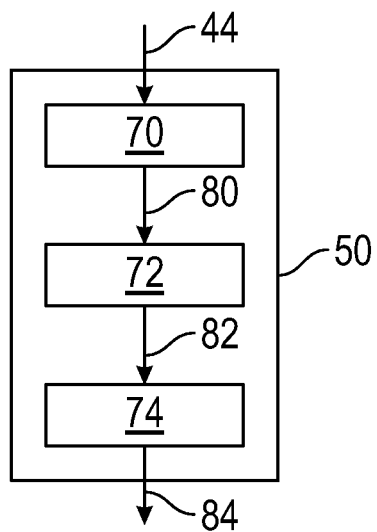
FIG. 3 is a block diagram of the tracking block shown in FIG. 2 that is part of the radar anti-spoofing system, according to an exemplary embodiment.

FIG. 3 is a block diagram of the tracking block 50 shown in FIG. 2. The tracking block 50 includes a clustering module 70, a merging module 72, and a matching module 74. The clustering module 70 of the tracking block 50 determines a plurality of clusters 80 based on the input detection points 44, where each cluster 80 represents a potential detected object. The clustering module 70 executes a clustering algorithm to divide the input detection points 44 from the plurality of radar sensors 20 into the plurality of clusters 80. In one exemplary embodiment, a fuzzy c-mean clustering algorithm may be used to divide the input detection points 44 into the plurality of clusters 80, where $P=\{p_i\}_{i=1}^{n}$ represents a set of input detection points and $C=\{c_j\}_{j=1}^{K}$ represents a set of clusters. Equation 1 is a membership function to determine a degree that a single detection point $p_i$ is in a cluster $c_j$.

$$W(p_i, c_j) = w_{ij} = \frac{1}{\sum_k \left(\frac{\|p_i - c_j\|}{\|p_i - c_k\|}\right)^{\frac{2}{m-1}}} \quad \text{Equation 1}$$

where $w_{ij}$ represents the degree that a single detection point $p_i$ is in a cluster $c_j$ and m is a hyper-parameter that controls a degree of fuzziness of the cluster. The value of $w_{ij}$ is in the range of [0, 1] and the hyper-parameter m is greater than 1.0, and in embodiments is set to 2.0.

It is to be appreciated that the set of input detection points P is created by randomly partitioning the input detection points 44, and an objective function is executed by the clustering module 70 to optimize the clustering of the input detection points P. In one embodiment, the objective function is expressed in Equations 2 and 3 as:

$$obj = \underset{C}{\text{argmin}} \sum_i \sum_j w_{ij}^m \|p_i - c_j\|^2 \quad \text{Equation 2}$$

$$c_j = \frac{\sum_i p_i w_{ij}^m}{\sum_i w_{ij}^m} \quad \text{Equation 3}$$

Continuing to refer to FIG. 3, the merging module 72 receives the plurality of clusters 80 as input, and merges close clusters together with one another to create a plurality of merged clusters 82. A close cluster is determined based on a minimum distance between the plurality of clusters 80, where the minimum distance is based on a resolution of the plurality of radar sensors 20 (FIG. 1) and an application domain. In one non-limiting embodiment, the minimum distance is dx=0.5 meters, dy=1.0 meters, and dz=0.0 meters. It is to be appreciated that before merging, there are far more clusters 80 than possible objects present in a scene and merging the clusters 80 reduces the number of clusters 80 within the scene to a number that is closer to the number of possible objects in the scene.

The matching module 74 receives the merged clusters 82 as input and matches cluster centers in one detection frame with cluster centers in a next detection frame based on a nearest neighbor technique to determine the time-matched clusters 84 that represent objects in the environment. In an embodiment, the matching module 74 determines matching candidate clusters for a set of clusters $C_t$ with respect to time for a given size of a neighborhood nb_sz based on Equation 4, which is:

$$nb_i = \{c_{t-1}(j) \in C_{t-1} : \|c_t(i) - c_{t-1}(j)\| \leq nb\_sz\} \quad \text{Equation 4}$$

where $C_t = \{c_t(i)\}_{i=1}^{n}$ and $C_{t-1} = \{C_{t-1}(j)\}_{j=1}^{m}$ are two sets of clusters computed from the detection frames at time t and time t−1, respectively. The time-matched clusters 84 are based on determining an argument of the minimum value between the SNR between the two sets of clusters computed from the detection frames at time t and time t−1, respectively, and is expressed in Equation 5 as $$c^* = \underset{c_{t-1}(j) \in nb_i}{\text{argmin}} \|SNR_{c_t(i)} - SNR_{c_{t-1}(j)}\| \quad \text{Equation 5}$$

where $SNR_{c_t(i)}$ is the signal to noise ratio of the cluster $c_t(i)$ and $SNR_{c_{t-1}(j)}$ is the signal to noise ratio of the cluster $c_{t-1}(j)$.

Referring back to FIG. 2, the time-matched clusters 84 that represent objects in the environment determined by the tracking block 50 are sent to the adjusted SNR block 52, the first velocity computation block 54, and the second velocity computation block 56. The adjusted SNR block 52 determines the adjusted SNR measure 62 for the time-matched cluster 84 by dividing the SNR of the time-matched cluster 84 by a range measurement of the time-matched cluster 84, and is expressed in Equation 6 as:

$$M_{snr}(i) = \frac{SNR_{c_t(i)}}{R_{c_t(i)}^2} \quad \text{Equation 6}$$

where $M_{snr}(i)$ is the adjusted SNR measure 62, $sNR_{c_t(i)}$ is the SNR of the cluster $c_t(i)$, and $R_{c_t(i)}$ is the range measurement of the cluster $c_t(i)$.

The first velocity computation block 54 determines the motion-based velocity 64 of the time-matched cluster 84 based on a motion vector of the time-matched cluster 84. In an embodiment, the motion vector of the cluster $c_t(i)$ is expressed as $mv(i)=(m_x(i),m_y(i),m_z(i))$, and the motion-based velocity 64 is determined by Equation 7:

$$V_{mt}(i) = \frac{\sqrt{m_x^2(i) + m_y^2(i) + m_z^2(i)}}{dt} \qquad \text{Equation 7}$$

where $V_{mt}(i)$ represents the motion-based velocity and dt is the time difference between two adjacent detection frames.

The second velocity computation block 56 determines a Doppler-frequency velocity 66 of the time-matched cluster 84 based on Equation 8, which is:

$$V_{dp}(i) = \frac{C}{2f_0} f_d(i) \qquad \text{Equation 8}$$

where $V_{dp}(i)$ is the Doppler-frequency velocity 66, C is the speed of light, $f_0$ is the carrier frequency; and $f_d(i)$ is the Doppler frequency of cluster $c_t(i)$, which is calculated by the object detection block 34. Specifically, the object detection block 34 uses the amplitudes of RF signals to detect target points and frequency difference (frequency shifts) to calculate the Doppler frequency for the input detection points 44.

The velocity-ratio block 58 determines the velocity-ratio measure 68 of the time-matched cluster 84 by dividing the motion-based velocity 64 by the Doppler-frequency velocity 66, and is expressed in Equation 9 as:

$$M_v(i) = \frac{V_{mt}(i)}{V_{dp}(i)} \qquad \text{Equation 9}$$

where $M_v(i)$ is the motion-based velocity 64.

Continuing to refer to FIG. 2, the identification block 60 receives the adjusted SNR measure 62 and the velocity-ratio measure 68. The identification block 60 identifies the time-matched cluster 84 as either a ghost object 88 or a real object 90 by a thresholding technique based on values of the adjusted SNR measure 62 and the velocity-ratio measure 68. Specifically, in reciprocity-based spoofing, the SNR measurements of ghost objects are not matched with their respective distances in terms of the radar equation (the fundamental relation between the characteristics of the radar, the target, and the received signal) because the time delay of the SNR measurements do not match the respective distances. Accordingly, a threshold range of values are selected for the adjusted SNR measure 62 to capture a mismatch between the SNR and the range measurement created by ghost objects. Furthermore, in reciprocity-based spoofing, the Doppler-frequency velocity of ghost objects do not match the motion-based velocity because Doppler frequencies are generated by aliasing intermediate frequencies and not by the movements of real targets. Accordingly, a threshold range of values are selected for the velocity-ratio measure 68 to capture a mismatch between the motion-based velocity 64 and the Doppler-frequency velocity 66. In an embodiment, the thresholding technique is expressed in Equation 10 as:

$$g(c_t) = \begin{cases} 1 & \text{if } \eta_1 \leq M_v \leq \eta_2 \text{ and } \beta_1 \leq M_{snr} \leq \beta_2 \\ 0 & \text{otherwise} \end{cases} \qquad \text{Equation 10}$$

where $(\eta_1,\eta_2,\beta_1,\beta_2)$ represent threshold values that are determined based on a statistical analysis of real application data. In an embodiment, $\eta_1=0$, $\eta_2=0.25$, $\beta_1=0$, and $\beta_2=4.0$. If $g(c_t)=1$, $c_t$ is a ghost object, and if $g(c_t)=0$, $c_t$ is a real object.

Figure 4:
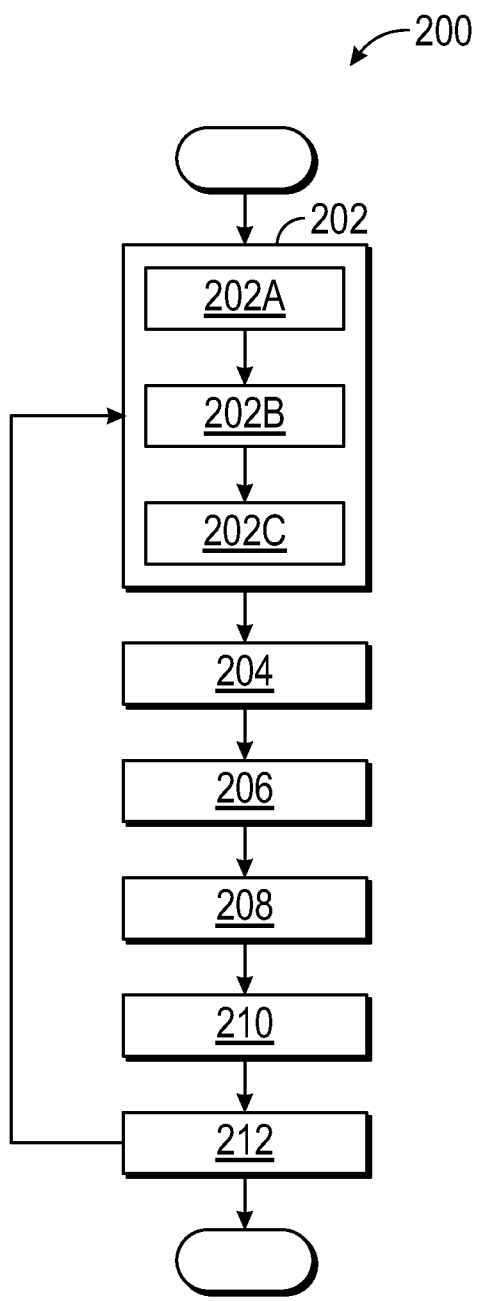
FIG. 4 is a process flow diagram illustrating a method for identifying ghost objects produced by reciprocity-based spoofing by the radar anti-spoofing system shown in FIG. 2, according to an exemplary embodiment.

FIG. 4 is a process flow diagram illustrating a method 200 for identifying ghost objects produced by reciprocity-based spoofing by the radar anti-spoofing system 40 shown in FIG. 2. Referring generally to FIGS. 1-4, the method 200 may begin at block 202. In block 202, the tracking block 50 determines time-matched clusters 84 that represent objects in the environment based on the input detection points 44 from the plurality of radar sensors 20. Specifically, in block 202A the clustering module 70 of the tracking block 50 executes a clustering algorithm to divide the input detection points 44 from the plurality of radar sensors 20 into the plurality of clusters 80. In block 202B, the merging module 72 merges close clusters of the plurality of clusters 80 together with one another to create the plurality of merged clusters 82. In block 202C, the matching module 74 matches cluster centers in one detection frame with cluster centers in a next detection frame for the merged clusters 82 based on a nearest neighbor technique to determine the time-matched clusters 84 that represent objects in the environment. The method 200 may then proceed to block 204.

In block 204, the adjusted SNR block 52 determines the adjusted SNR measure 62 for a specific time-matched cluster 84 by dividing the SNR of the specific time-matched cluster 84 by the range measurement of the time-matched cluster 84. The method 200 may then proceed to block 206.

In block 206, the first velocity computation block 54 determines the motion-based velocity 64 of the time-matched cluster 84 based on a motion vector of the time-matched cluster as described in Equation 7 above. The method 200 may then proceed to block 208.

In block 208, the second velocity computation block 56 determines the Doppler-frequency velocity 66 of the time-matched cluster 84 based on Equation 8, which is described above. It is to be appreciated that although block 204, 206, and 208 are shown in sequential order, the blocks 204, 206, and 208 may be computed at the same time based on parallel computation. The method 200 may then proceed to block 210.

In block 210, the velocity-ratio block 58 determines the velocity-ratio measure 68 of the time-matched cluster 84 by dividing the motion-based velocity 64 by the Doppler-frequency velocity 66. The method 200 may then proceed to block 212.

In block 212, the identification block 60 identifies each time-matched cluster 84 as either a ghost object 88 or a real object 90 by a thresholding technique based on the values of the adjusted SNR measure 62 and the velocity-ratio measure. The method 200 may then terminate or return to block 202.

Referring generally to the figures, the disclosed radar anti-spoofing system provides various technical effects and benefits for mitigating reciprocity-based sensor spoofing using real-time computation. Specifically, the radar anti-spoofing system provides an effective approach for identifying ghost objects by computing two identification measures for detected object, namely the adjusted SNR measure and the velocity-ratio measure. When simulating reciprocity-based sensor spoofing, the disclosed radar anti-spoofing system produced an average classification accuracy of 92.3% in identifying ghost objects over 760 detection frames. Thus, the disclosed radar anti-spoofing system is effective in identifying ghost objects using reciprocity-based sensor spoofing.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A radar anti-spoofing system for an autonomous vehicle, the radar anti-spoofing system comprising:
    a plurality of radar sensors that generate a plurality of input detection points representing radio frequency (RF) signals reflected from actual targets; and
    one or more controllers in electronic communication with the plurality of radar sensors, wherein the one or more controllers execute instructions to:
        determine time-matched clusters that represent objects located in an environment surrounding the autonomous vehicle based on the plurality of input detection points from the plurality of radar sensors;
        determine an adjusted signal to noise (SNR) measure for a specific time-matched cluster by dividing an SNR of the specific time-matched cluster by a range measurement of the specific time-matched cluster;
        determine a motion-based velocity of the time-matched cluster based on a motion vector of the time-matched cluster;
        determine a Doppler-frequency velocity of the time-matched cluster;
        determine a velocity-ratio measure of the time-matched cluster by dividing the motion-based velocity by the Doppler-frequency velocity; and
        identify the time-matched cluster as either a ghost object or a real object by a thresholding technique based on the values of the adjusted SNR measure and the velocity-ratio measure, wherein the thresholding technique includes selecting a threshold range of values for the adjusted SNR measure that capture a mismatch between an SNR and the range measurement that is created by the ghost object, and wherein the ghost object is produced by reciprocity-based spoofing where the RF signals are reflected from the actual targets but were originally emitted by a spoofer.

2. The radar anti-spoofing system of claim 1, wherein the controller executes instructions to:
    execute a clustering algorithm to divide the plurality of input detection points from the plurality of radar sensors into a plurality of clusters.

3. The radar anti-spoofing system of claim 2, wherein the clustering algorithm is a fuzzy c-mean clustering algorithm.

4. The radar anti-spoofing system of claim 2, wherein the controller executes instructions to:
    merge close clusters of the plurality of clusters together with one another to create a plurality of merged clusters, wherein a close cluster is determined based on a minimum distance between the plurality of clusters.

5. The radar anti-spoofing system of claim 4, wherein the minimum distance is based on a resolution of the plurality of radar sensors and an application domain.

6. The radar anti-spoofing system of claim 4, wherein the controller executes instructions to:
    match cluster centers in one detection frame with cluster centers in a next detection frame for the plurality of merged clusters based on a nearest neighbor technique to determine the time-matched clusters.

7. The radar anti-spoofing system of claim 2, wherein a membership function to determine a degree that a single detection point $p_i$ is in a cluster $c_j$ is determined by:

$$W(p_i, c_j) = w_{ij} = \frac{1}{\sum_k \left(\frac{\|p_i - c_j\|}{\|p_i - c_k\|}\right)^{\frac{2}{m-1}}}$$

wherein $p_i$ represents the single detection point, $c_j$ represents the cluster, $w_{ij}$ represents a degree that the single detection point is in the cluster, and m is a hyper-parameter that controls a degree of fuzziness of the cluster.

8. The radar anti-spoofing system of claim 7, wherein a value of the degree that the single detection point is in the cluster is in the range of [0, 1] and the hyper-parameter is greater than 1.0.

9. The radar anti-spoofing system of claim 1, wherein the motion-based velocity is determined by:

$$V_{mt}(i) = \frac{\sqrt{m_x^2(i) + m_y^2(i) + m_z^2(i)}}{dt}$$

where $V_{mt}(i)$ represents the motion-based velocity, $mv(i) = (m_x(i), m_y(i), m_z(i))$ is the motion vector of a cluster $c_t(i)$, and dt is a time difference between two adjacent detection frames.

10. The radar anti-spoofing system of claim 1, wherein the Doppler-frequency velocity is determined by:

$$V_{dp}(i) = \frac{C}{2f_0} f_d(i)$$

where $V_{dp}(i)$ is the Doppler-frequency velocity, C is a speed of light, $f_0$ is a carrier frequency; and $f_d(i)$ is the Doppler-frequency of cluster $c_t(i)$.

11. The radar anti-spoofing system of claim 1, wherein the thresholding technique includes selecting a threshold range of values for the velocity-ratio measure to capture a mismatch between the motion-based velocity and the Doppler-frequency velocity created by the ghost object.

12. A method for identifying ghost objects produced by reciprocity-based spoofing by a radar anti-spoofing system for an autonomous vehicle, the method comprising:
    determining, by a controller, time-matched clusters that represent objects located in an environment surrounding the autonomous vehicle based on a plurality of input detection points generated by a plurality of radar sensors;

determining, by the controller, an adjusted SNR measure for a specific time-matched cluster by dividing an SNR of the specific time-matched cluster by a range measurement of the specific time-matched cluster;

determining a motion-based velocity of the time-matched cluster based on a motion vector of the time-matched cluster;

determining a Doppler-frequency velocity of the time-matched cluster;

determining a velocity-ratio measure of the time-matched cluster by dividing the motion-based velocity by the Doppler-frequency velocity; and identifying the time-matched cluster as either a ghost object or a real object by a thresholding technique based on the values of the adjusted SNR measure and the velocity-ratio measure, wherein the thresholding technique includes selecting a threshold range of values for the adjusted SNR measure that capture a mismatch between an SNR and the range measurement that is created by the ghost object, and wherein the ghost object is produced by reciprocity-based spoofing where RF signals are reflected from actual targets but were originally emitted by a spoofer.

13. The method of claim 12, wherein the method further comprises:

executing a clustering algorithm to divide the plurality of input detection points from the plurality of radar sensors into a plurality of clusters.

14. The method of claim 13, wherein the clustering algorithm is a fuzzy c-mean clustering algorithm.

15. The method of claim 13, wherein the method further comprises:

merging close clusters of the plurality of clusters together with one another to create a plurality of merged clusters, wherein a close cluster is determined based on a minimum distance between the plurality of clusters.

16. The method of claim 15, wherein the method further comprises:

matching cluster centers in one detection frame with cluster centers in a next detection frame for the plurality of merged clusters based on a nearest neighbor technique to determine the time-matched clusters.

17. The method of claim 13, wherein the method further comprises executing a membership function to determine a degree that a single detection point $p_i$ is in a cluster $c_j$ is determined by:

$$W(p_i, c_j) = w_{ij} = \frac{1}{\sum_k \left(\frac{\|p_i - c_j\|}{\|p_i - c_k\|}\right)^{\frac{2}{m-1}}}$$

wherein $p_i$ represents the single detection point, $c_j$ represents the cluster, $w_{ij}$ represents the degree that the single detection point is in the cluster, and m is a hyper-parameter that controls a degree of fuzziness of the cluster.

18. The method of claim 12, wherein the method further comprises determining the motion-based velocity by:

$$V_{mt}(i) = \frac{\sqrt{m_x^2(i) + m_y^2(i) + m_z^2(i)}}{dt}$$

where $V_{mt}(i)$ represents the motion-based velocity, $mv(i)=(m_x(i), m_y(i), m_z(i))$ is the motion vector of a cluster $c_t(i)$, and dt is a time difference between two adjacent detection frames.

19. The method of claim 12, wherein the method further comprises determining the Doppler-frequency velocity by:

$$V_{dp}(i) = \frac{C}{2f_0} f_d(i)$$

where $V_{dp}(i)$ is the Doppler-frequency velocity, C is a speed of light, $f_0$ is a carrier frequency; and $f_d(i)$ is the Doppler frequency of cluster $c_t(i)$.

20. The method of claim 12, wherein the thresholding technique includes selecting a threshold range of values for the velocity-ratio measure to capture a mismatch between the motion-based velocity and the Doppler-frequency velocity created by the ghost object.

* * * * *